United States Patent
Li et al.

(10) Patent No.: US 11,231,595 B2
(45) Date of Patent: Jan. 25, 2022

(54) SEMI-TRANSPARENT SEMI-RETROREFLECTIVE FILM AND AIR DISPLAY DEVICE

(71) Applicant: BOE TECHNOLOGY GROUP CO., LTD., Beijing (CN)

(72) Inventors: Xiaolong Li, Beijing (CN); Wei Qin, Beijing (CN); Kuanjun Peng, Beijing (CN); Xueling Gao, Beijing (CN); Fangzhen Zhang, Beijing (CN); Jintao Peng, Beijing (CN); Jinqian Wang, Beijing (CN); Miaomiao Yang, Beijing (CN); Shuang Sun, Beijing (CN); Chunfang Zhang, Beijing (CN); Shengnan Li, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 280 days.

(21) Appl. No.: 16/442,975

(22) Filed: Jun. 17, 2019

(65) Prior Publication Data
US 2020/0033618 A1  Jan. 30, 2020

(30) Foreign Application Priority Data
Jul. 24, 2018 (CN) .......................... 201810822083.0

(51) Int. Cl.
*G02B 30/56* (2020.01)
*G02B 30/25* (2020.01)
*G02B 5/124* (2006.01)

(52) U.S. Cl.
CPC ............. *G02B 30/56* (2020.01); *G02B 5/124* (2013.01); *G02B 30/25* (2020.01)

(58) Field of Classification Search
CPC ........ G02B 30/56; G02B 30/25; G02B 5/124; G02B 5/3066; G02B 5/128; G02B 27/283; G02B 30/60; G02B 5/00
See application file for complete search history.

(56) References Cited

U.S. PATENT DOCUMENTS

| | | | |
|---|---|---|---|
| 5,943,167 A * | 8/1999 | Kelly | G02B 5/3066 359/485.02 |
| 8,780,039 B2 | 7/2014 | Gay et al. | |

(Continued)

FOREIGN PATENT DOCUMENTS

| | | |
|---|---|---|
| CN | 102203660 A | 9/2008 |
| CN | 103837915 A | 6/2014 |

(Continued)

OTHER PUBLICATIONS

First Chinese Office Action from corresponding Chinese Patent Application No. 201810822083.0 dated Jun. 17, 2020.

*Primary Examiner* — Jade R Chwasz
(74) *Attorney, Agent, or Firm* — Dilworth & Barrese, LLP.; Michael J. Musella, Esq.

(57) ABSTRACT

A semi-transparent semi-retroreflective film and an air display device are provided. The air display device includes: a first polarizer and a second polarizer assembled with each other to form a cell; a semi-transparent semi-reflective structure and a semi-transparent semi-retroreflective film disposed between the first polarizer and the second polarizer; a first ¼ wave plate disposed at a side of the air display device adjacent to the first polarizer; and a second ¼ wave plate disposed between the semi-transparent semi-reflective structure and the semi-transparent semi-retroreflective film. The air display device is configured such that polarized light incident from the first polarizer, after being processed by an internal optical path of the air display device, exits from the (Continued)

second polarizer to form an air image at a side of the air display device away from the first polarizer.

18 Claims, 11 Drawing Sheets

(56) References Cited

U.S. PATENT DOCUMENTS

2017/0031157 A1\* 2/2017 Koito ................. G02B 27/0018
2017/0227929 A1 8/2017 Suginohara
2017/0261759 A1 9/2017 Yamamoto

FOREIGN PATENT DOCUMENTS

| CN | 103926744 A | 7/2014 |
| CN | 106990602 A | 7/2017 |
| CN | 107111149 A | 8/2017 |
| JP | 2011253128 A | 12/2011 |
| WO | 2014076993 A1 | 5/2014 |

\* cited by examiner forming a retroreflective layer having a microstructure on a transparent substrate, and forming a semi-transparent semi-reflective layer on a side of the retroreflective layer away from the transparent substrate ~S210 forming a planarization layer on the semi-transparent semi-reflective layer ~S220

SEMI-TRANSPARENT SEMI-RETROREFLECTIVE FILM AND AIR DISPLAY DEVICE

CROSS-REFERENCE TO RELATED APPLICATION

The present application claims priority of the Chinese Patent Application No. 2018/10822083.0, filed on Jul. 24, 2018, the disclosure of which is incorporated herein by reference in its entirety as part of the present application.

TECHNICAL FIELD

Embodiments of the present disclosure relate to a semi-transparent semi-retroreflective film and an air display device.

BACKGROUND

Air imaging technology refers to displaying a two-dimensional or three-dimensional image in the air directly without the help of a medium, and a person or an object can directly "pass through" an air image of the two-dimensional or three-dimensional image, thereby achieving an excellent interactive and immersive display effect.

At present, relatively mature air display products in the market mostly use projection techniques such as aerial fog projection display, holographic projection display and laser projection display. In these projection display techniques, the aerial fog projection display projects a picture onto the aerial fog, the displayed picture is a plane, and the quality of the picture is extremely unstable; the holographic projection display divides light emitted by a bottom light source into two light beams, one light beam is directly incident on a photosensitive sheet, the other light beam is reflected by an object being photographed and then incident on the photosensitive sheet, and the two light beams are superimposed on the photosensitive sheet to generate interference patterns, so as to obtain a holographic image, and this projection mode uses a huge display device and has a poor display definition; the laser projection display ionizes the air in a closed container and uses a laser to present a three-dimensional picture, but the displayed three-dimensional picture is very unstable, and has too many picture fluctuations and a single color.

SUMMARY

In a first aspect, an embodiment of the present disclosure provides a semi-transparent semi-retroreflective film, which includes: a retroreflective layer having a microstructure; and a semi-transparent semi-reflective layer and a planarization layer sequentially disposed at a light exiting side of the retroreflective layer. The semi-transparent semi-retroreflective film is configured such that a part of incident light reaching a light incident side of the retroreflective layer is retroreflected in an incident direction, and another part of the incident light passing through the retroreflective layer, the semi-transparent semi-reflective layer and the planarization layer exits in the incident direction.

Optionally, the retroreflective layer includes a retroreflective region and a transmission region, and the semi-transparent semi-reflective layer is disposed at a side of the retroreflective region facing away from the light incident side of the retroreflective layer.

Optionally, the microstructure of the retroreflective layer includes at least one of a prism structure and a microsphere structure.

In a second aspect, an embodiment of the present disclosure provides an air display device, which includes: a first polarizer and a second polarizer assembled with each other to form a cell; a semi-transparent semi-reflective structure and the semi-transparent semi-retroreflective film according to claim 1, disposed between the first polarizer and the second polarizer; a first ¼ wave plate disposed at a side of the air display device adjacent to the first polarizer; and a second ¼ wave plate disposed between the semi-transparent semi-reflective structure and the semi-transparent semi-retroreflective film. The air display device is configured such that polarized light incident from the first polarizer, upon being processed by an internal optical path of the air display device, exits from the second polarizer to form an air image at a side of the air display device away from the first polarizer.

Optionally, the air display device further includes a light source, the first polarizer is disposed adjacent to the light source and located in a light-emitting direction of the light source.

Optionally, the light source is one of a display device and a three-dimensional object.

Optionally, a through axis of the first polarizer and a through axis of the second polarizer are arranged to be parallel to each other.

Optionally, the air display device further includes: a ½ wave plate disposed between the first polarizer and the first ¼ wave plate; a through axis of the first polarizer and a through axis of the second polarizer are arranged to be perpendicular to each other.

Optionally, the ½ wave plate includes a switch, the switch is configured to control the air display device to perform air imaging by controlling a turn-on or a turn-off of the ½ wave plate.

Optionally, the semi-transparent semi-retroreflective film is disposed at a side of the second polarizer, and the semi-transparent semi-reflective structure is disposed at a side of the second ¼ wave plate; or, the semi-transparent semi-retroreflective film is disposed at a side of the second ¼ wave plate, and the semi-transparent semi-reflective structure is disposed at a side of the second polarizer.

Optionally, the semi-transparent semi-reflective structure includes at least one of a semi-transparent semi-reflective film and a reflective polarizer.

Optionally, a maximum refractive index axis of the first ¼ wave plate and a maximum refractive index axis of the second ¼ wave plate have an angle of 45 degrees with respect to a through axis of the first polarizer or a through axis of the second polarizer, respectively.

Optionally, a maximum refractive index axis of the ½ wave plate has an angle of 45 degrees with respect to a through axis of the first polarizer or a through axis of the second polarizer.

In a third aspect, an embodiment of the present disclosure provides an air display device, which includes: a light source; a first polarizer, disposed adjacent to the light source and located in a light-emitting direction of the light source; the semi-transparent semi-retroreflective film according to the first aspect and a reflective polarizer, sequentially disposed at a side of the first polarizer away from the light source; a first ¼ wave plate disposed at a side of the air display device adjacent to the first polarizer; and a second ¼ wave plate disposed between the reflective polarizer and the semi-transparent semi-retroreflective film. The air display device is configured such that polarized light emitted from the light source and incident from the first polarizer, upon being processed by an internal optical path of the air display device, exits from the reflective polarizer to form an air image at a side of the air display device away from the first polarizer.

Optionally, the light source is one of a display device and a three-dimensional object.

Optionally, a through axis of the first polarizer and a through axis of the reflective polarizer are arranged to be parallel to each other.

Optionally, the air display device further includes: a ½ wave plate disposed between the first polarizer and the first ¼ wave plate; a maximum refractive index axis of the ½ wave plate has an angle of 45 degrees with respect to a through axis of the first polarizer.

Optionally, the ½ wave plate includes a switch, the switch is configured to control the air display device for air imaging by controlling a turn-on or turn-off of the ½ wave plate.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
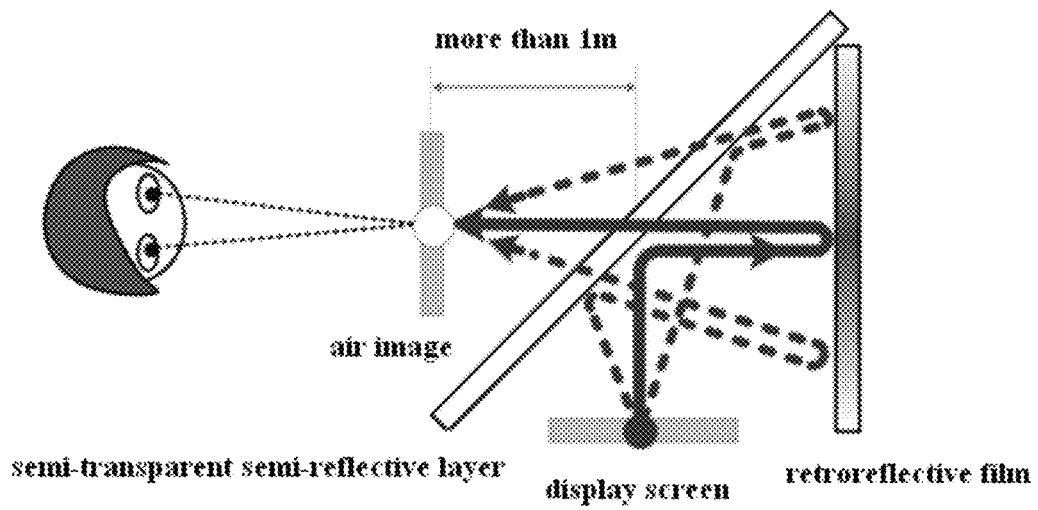
FIG. 1 is a schematic diagram illustrating a display principle of an air display device.

FIG. 1 is a schematic diagram illustrating a display principle of an air display device. As illustrated in FIG. 1, the air display device "duplicates" an image displayed on a display screen into the air through a combined optical path formed by a retroreflective film and a semi-transparent semi-reflective layer, so that a person or an object can pass through the air image, thereby achieving an effect with a good interactive experience. However, the air display device using the stereoscopic optical structure illustrated in FIG. 1 is quite huge, and the air image can only be a plane picture, rather than a three-dimensional picture. At the same time, it also involves a problem of secondary reflection, which affects a final display effect.

Embodiments of the present disclosure provide a semi-transparent semi-retroreflective film and an air display device, which can realize air displaying of a three-dimensional image, has a good display effect, and has a reasonable volume of equipment.

Figure 2:
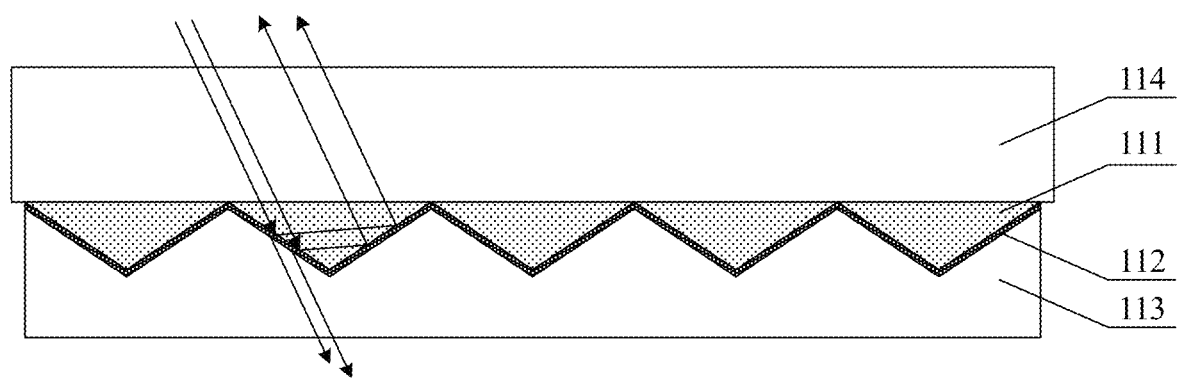
FIG. 2 is a schematic structural diagram of a semi-transparent semi-retroreflective film provided by an embodiment of the present disclosure.

FIG. 2 is a schematic structural diagram of a semi-transparent semi-retroreflective film provided by an embodiment of the present disclosure. As illustrated in FIG. 2, the semi-transparent semi-retroreflective film 110 provided by the present embodiment can include: a retroreflective layer 111 having a microstructure; and a semi-transparent semi-reflective layer 112 and a planarization layer 113 sequentially disposed at a light exiting side of the retroreflective layer 111.

The semi-transparent semi-retroreflective film 110 is configured to cause a part of incident light reaching a light incident side of the retroreflective layer 111 to have a reverse reflection in an incident direction, and to cause another part of the incident light passing through the retroreflective layer 111, the semi-transparent semi-reflective layer 112 and the planarization layer 113 to exit in the incident direction.

It should be noted that, "a reverse reflection in an incident direction" as described herein means, for example, being reflected back in a direction parallel to the incident direction; "exit in the incident direction" as described herein means, for example, exiting at an angle as same as the incident angle, for example, in a direction parallel to the incident direction, as illustrated by the arrow in FIG. 2.

The semi-transparent semi-retroreflective film 110 provided by the embodiment of the present disclosure is a film having a special optical effect obtained by utilizing optical principles of the semi-transparent semi-reflective layer 112 and the retroreflective layer 111, in which the retroreflective layer 111 having the microstructure is disposed at a location adjacent to the incident light, and the planarization layer 113 is disposed at a light-exiting location. In the semi-transparent semi-retroreflective film 110 of the embodiment illustrated in FIG. 2, the semi-transparent semi-reflective layer 112 is disposed at a light-exiting side of the entire retroreflective layer 111, and the optical principle of the semi-transparent semi-retroreflective film 110 is: when light is incident on the retroreflective layer 111 of the semi-transparent semi-retroreflective film 110 at any angle, the microstructure of the retroreflective layer 111 can reflect a part of the light back in the incident direction, and allow another part of the light to pass through the retroreflective layer 111 and reach the semi-transparent semi-reflective layer 112. Due to a refraction effect of the retroreflective layer 111, a direction of the light reaching the semi-transparent semi-reflective layer 112 is changed, that is, the direction of the light passing through the semi-transparent semi-reflective layer 112 is different from the incident direction thereof. The arrangement of the planarization layer 113 can eliminate the direction change of the light resulted by the refraction effect of the retroreflective layer 111, that is, after passing through the planarization layer 113, the light will exit in the original incident direction.

It should be noted that, in the semi-transparent semi-retroreflective film 110 provided by the embodiment of the present disclosure, a transparent substrate 114 is further disposed at a side of the retroreflective layer 111 away from the semi-transparent semi-reflective layer 112. In a process of manufacturing the semi-transparent semi-retroreflective film 110, the substrate 114 can be used as a base layer for forming each film layer having an optical effect, and the retroreflective layer 111 can be manufactured on the substrate 114.

Figure 3:
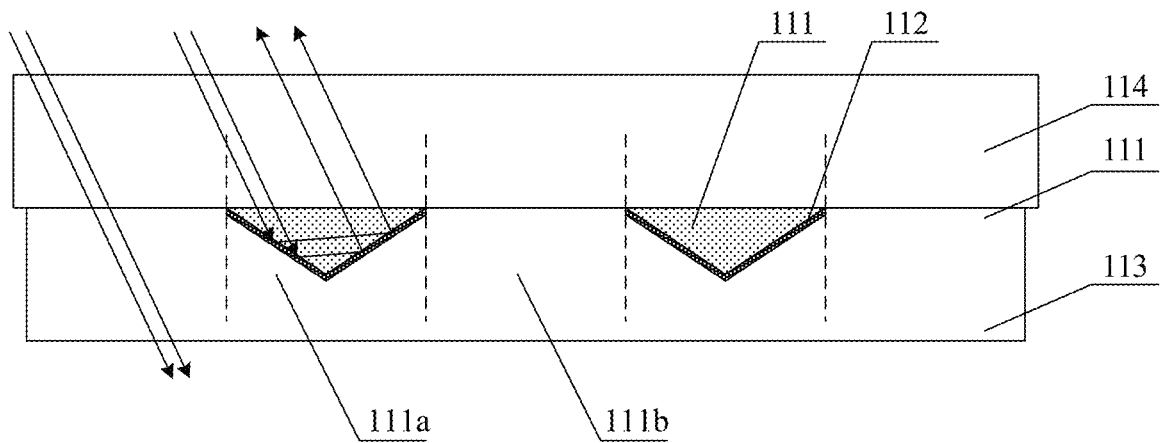
FIG. 3 is a schematic structural diagram of a semi-transparent semi-retroreflective film provided by another embodiment of the present disclosure.

Optionally, FIG. 3 is a schematic structural diagram of a semi-transparent semi-retroreflective film provided by another embodiment of the present disclosure. In the present embodiment, the retroreflective layer 111 can include a retroreflective region 111a and a transmission region 111b, and the semi-transparent semi-reflective layer 112 is disposed at a side of the retroreflective region 111a facing away from the light incident side of the retroreflective layer 111.

In the semi-transparent semi-retroreflective film 110 illustrated in FIG. 3, the retroreflective region 111a and the transmission region 111b in the retroreflective layer 111 are repeatedly arranged in an array arrangement, that is, in the entire retroreflective layer 111, about one half of the region is the retroreflective region 111a, and the other half is the transmission region 111b; moreover, the semi-transparent semi-reflective layer 112 is provided only at a side of the retroreflective region 111a facing away from the light incident side of the retroreflective layer 111 (i.e., a side away from the substrate 114). The semi-transparent semi-retroreflective film 110 provided by the embodiment illustrated in FIG. 3 adopts a structure in which the semi-transparent semi-reflective layer 112 is stacked on the retroreflective region 111a, to achieve an optical effect that a part of the incident light has a total reflection while another part of the incident light irradiated onto the transmission region 111b passes through the transmission region 111b and the planarization layer 113 to exit in the incident direction.

The semi-transparent semi-retroreflective film 110 provided by the embodiment of the present disclosure can achieve technical effects as follows: when light is incident on the semi-transparent semi-retroreflective film 110 at any angle, a part (about a half) of the incident light directly passes through the semi-transparent semi-retroreflective film 110 and then exits in an exiting direction having no change with respect to the incident direction, while another part (about a half) of the incident light has a reverse reflection and is returned back along the original optical path in the incident direction.

Figure 4:
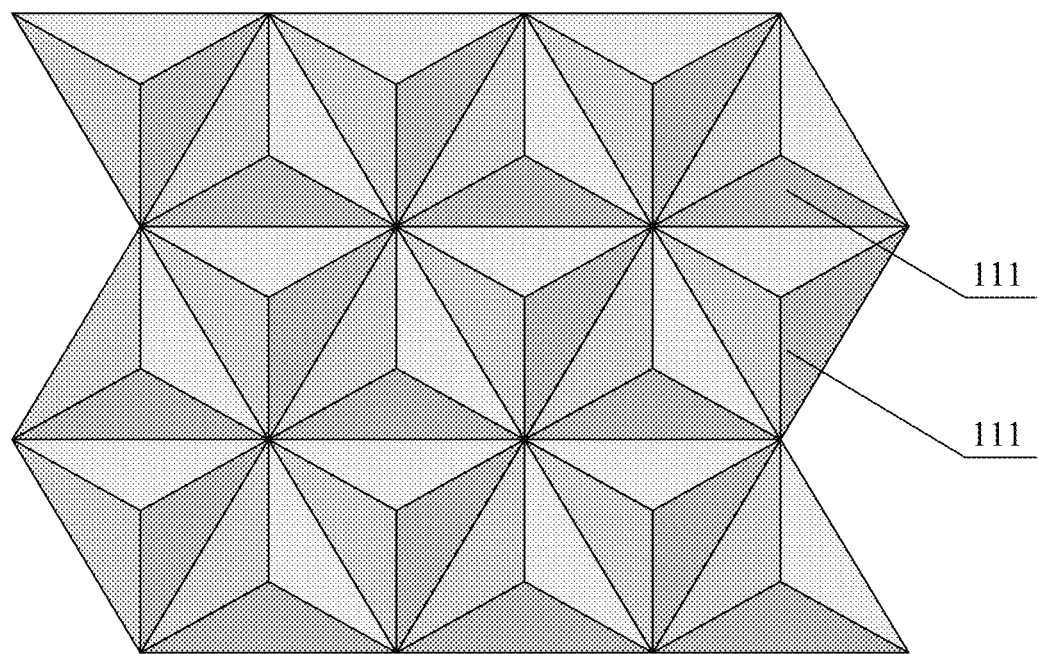
FIG. 4 is a schematic view of a microstructure of the semi-transparent semi-retroreflective film illustrated in FIG. 2.
Figure 5:
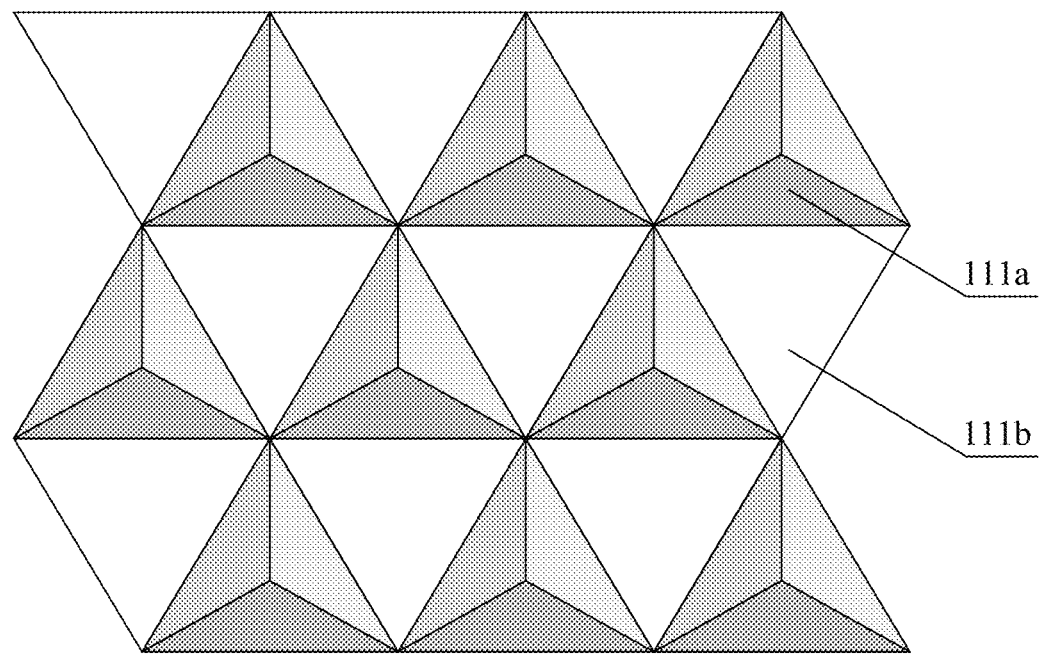
FIG. 5 is a schematic view of a microstructure of the semi-transparent semi-retroreflective film illustrated in FIG. 3.

Optionally, in the embodiment of the present disclosure, the microstructure of the retroreflective layer 111 is, for example, at least one of a prism structure and a microsphere structure. Taking a microstructure in a form of a prism structure as an example, FIG. 4 is a schematic view of the microstructure of the semi-transparent semi-retroreflective film in the embodiment illustrated in FIG. 2, and FIG. 5 is a schematic view of the microstructure of the semi-transparent semi-retroreflective film in the embodiment illustrated in FIG. 3.

Figure 6:
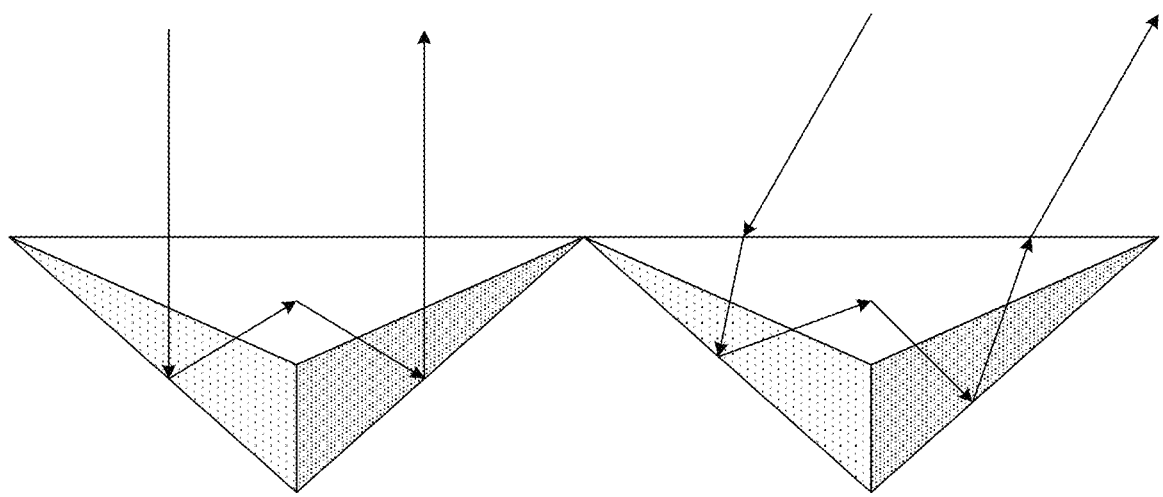
FIG. 6 is a schematic diagram illustrating an optical principle of a prism structure in a semi-transparent semi-retroreflective film provided by an embodiment of the present disclosure.

FIG. 6 is a schematic diagram illustrating an optical principle of a prism structure on a retroreflective layer in a semi-transparent semi-retroreflective film provided by an embodiment of the present disclosure. As can be seen from FIG. 6, the prism structure can retroreflect a part of the light in the incident direction, and the retroreflectivity of the retroreflective layer 111 including the prism structure can reach 58% or more.

Figures 7, 8:
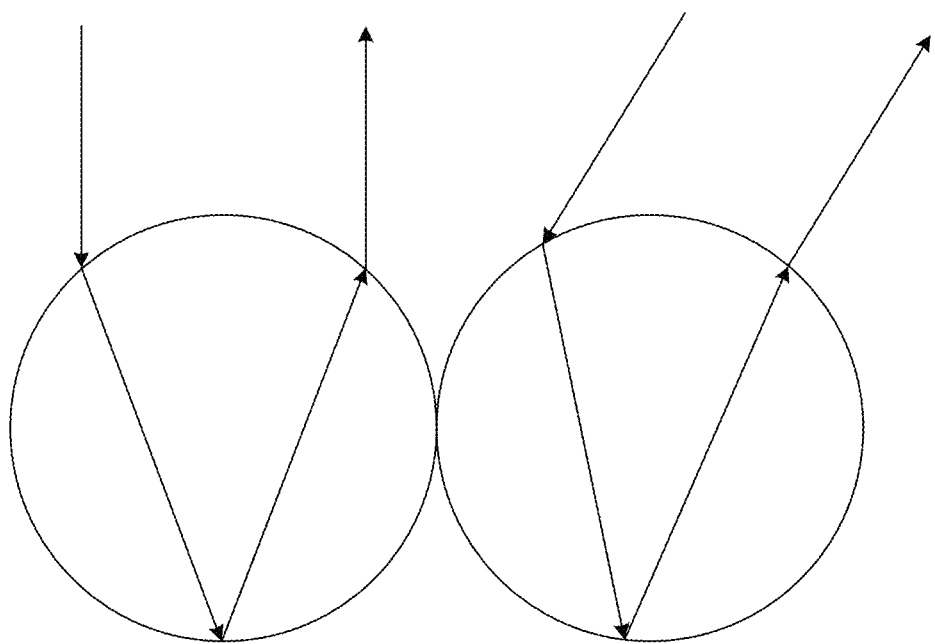
FIG. 7 is a schematic diagram illustrating an optical principle of a microsphere structure in a semi-transparent semi-retroreflective film provided by an embodiment of the present disclosure.
FIG. 8 is a flowchart of a manufacturing method of a semi-transparent semi-retroreflective film provided by an embodiment of the present disclosure.

FIG. 7 is a schematic diagram illustrating an optical principle of a microsphere structure on a retroreflective layer in a semi-transparent semi-retroreflective film provided by an embodiment of the present disclosure. The microsphere structure can also achieve the effect of retroreflecting a part of the light in the incident direction.

Optionally, in the embodiment of the present disclosure, the semi-transparent semi-reflective layer 112 can be a metal film layer which has an extremely small thickness and is evaporated onto a surface of the retroreflective layer 111. Because the thickness of the metal film layer is extremely small, about a half of the incident light can pass through the metal film layer, and another half of the incident light can be retroreflected in the incident direction.

Based on the same inventive principle as the semi-transparent semi-retroreflective film 110 provided by the embodiments of the present disclosure, embodiments of the present disclosure also provide a manufacturing method of a semi-transparent semi-retroreflective film, for manufacturing any semi-transparent semi-retroreflective film 110 provided by the above embodiments of the present disclosure.

FIG. 8 is a flowchart of a manufacturing method of a semi-transparent semi-retroreflective film provided by an embodiment of the present disclosure. As illustrated in FIG. 8, the manufacturing method provided by the present embodiment includes steps S210 to S220 as follows.

S201: forming a retroreflective layer having a microstructure on a transparent substrate, and forming a semi-transparent semi-reflective layer on a side of the retroreflective layer away from the transparent substrate.

S220: forming a planarization layer on the semi-transparent semi-reflective layer.

In the present embodiment, the microstructure of the retroreflective layer can include, for example, at least one of a prism structure and a microsphere structure; moreover, when the microstructure manufactured on the retroreflective layer is different, the corresponding manufacturing flow and processes are different.

In one implementation of the present embodiment, taking the microstructure of the retroreflective layer being a prism structure and the retroreflective layer being composed of prism structures arranged in an array as an example, the step S210 can include steps 11-13 as follows.

Step 11: forming a flexible transparent film layer on a transparent substrate.

Step 12: imprinting the flexible transparent film layer by an imprinting process, to form a retroreflective layer having a prism structure. The prism structure of the retroreflective layer can be referred to the microstructure pattern illustrated in FIG. 4.

Step 13: forming a semi-transparent semi-reflective layer at a light exiting side of the retroreflective layer.

In the present embodiment, the material used for forming the retroreflective layer is a soft transparent material. That is, firstly, one layer of flexible transparent film layer is formed, and then the flexible transparent film layer is imprinted by the imprinting process to obtain the prism structure in the flexible transparent film layer, thereby forming the retroreflective layer having the prism structure as illustrated in FIG. 4. Subsequently, an extremely thin metal film layer, that is, a semi-transparent semi-reflective layer, is formed on the prism structure of the retroreflective layer. For example, the metal film layer can be formed on an entire surface at the light exiting side of the retroreflective layer by using magnetron sputtering deposition process or evaporation deposition process.

In another implementation of the present embodiment, taking the case where the retroreflective layer includes a retroreflective region and a transmission region, and the semi-transparent semi-reflective layer is disposed at a side of the retroreflective region away from the transparent substrate, and the microstructure of the retroreflective layer is a prism structure, as an example, an implementation of step S210 can include steps 11-13 as follows.

Step 11: forming a flexible transparent film layer on a transparent substrate.

Step 12: imprinting the flexible transparent film layer by an imprinting process, to form a retroreflective layer including a retroreflective region and a transmission region. The microstructure of the retroreflective layer can be referred to the microstructure pattern illustrated in FIG. 5, namely including a retroreflective region and a transmission region arranged in an array.

Step 13: forming a semi-transparent semi-reflective layer at a side of the retroreflective region away from the transparent substrate.

In the present embodiment, for the retroreflective layer formed by the imprinting process, the retroreflective region has a prism structure and the transmission region has a plane structure, and the retroreflective region and the transmission region are repeatedly arranged in an array arrangement, as illustrated in FIG. 5. Subsequently, an extremely thin metal film layer, that is, a semi-transparent semi-reflective layer, is formed on a side of the retroreflective region (i.e. the prism structure) of the retroreflective layer away from the transparent substrate. For example, the metal film layer can be evaporated in the retroreflective region by evaporation deposition process.

In still another implementation of the present embodiment, taking the case where the microstructure of the retroreflective layer is a microsphere structure and the retroreflective layer is composed of microsphere structures arranged in an array as an example, an implementation of the step S210 can include steps 21-23 as follows.

Step 21: forming a retroreflective layer having a microsphere structure by using a plurality of microspheres arranged in an array.

Step 22: forming a semi-transparent semi-reflective layer at a side of the microsphere structure.

Step 23: disposing the retroreflective layer having the microsphere structure on a transparent substrate, and locating the semi-transparent semi-reflective layer at a side of the microsphere structure away from the transparent substrate.

In the present embodiment, the plurality of microspheres are arranged in an array to form the microsphere structure in the retroreflective layer. After the microsphere structure is formed, a semi-transparent semi-reflective layer can be formed at a side of the microsphere structure, and the semi-transparent semi-reflective layer can also be an extremely thin metal film layer; or, a semi-transparent semi-reflective layer can be evaporated onto a side surface of the microsphere structure, so that the semi-transparent semi-reflective layer conforms to the microsphere structure. After the microsphere structure and the semi-transparent semi-reflective layer on the side surface of the microsphere structure are formed, the microsphere structure and the semi-transparent semi-reflective layer are integrally manufactured on the transparent substrate. It should be noted that, the retroreflective layer in the completed semi-transparent semi-retroreflective film is adjacent to the light incident side, and the metal film layer is close to the light exiting side.

Based on the same inventive principle as the semi-transparent semi-retroreflective film provided by the embodiments of the present disclosure, embodiments of the present disclosure also provide an air display device.

Figure 9:
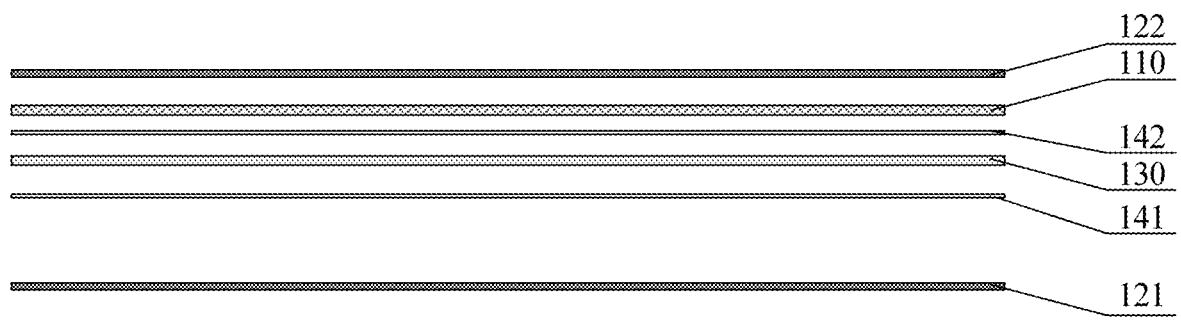
FIG. 9 is a schematic structural diagram of an air display device provided by an embodiment of the present disclosure.

FIG. 9 is a schematic structural diagram of an air display device provided by an embodiment of the present disclosure. As illustrated in FIG. 9, the air display device 100 provided by the embodiment of the present disclosure can include: a first polarizer 121 and a second polarizer 122 assembled with each other to form a cell; a semi-transparent semi-reflective structure 130 and a semi-transparent semi-retroreflective film 110 provided by any one of the above embodiments, disposed between the first polarizer 121 and the second polarizer 122; a first ¼ wave plate 141 disposed at a side of the air display device 100 adjacent to the first polarizer 121; and a second ¼ wave plate 142 disposed between the semi-transparent semi-reflective structure 130 and the semi-transparent semi-retroreflective film 110.

In the present embodiment, the first polarizer 121 is configured to absorb polarized light of a specified direction and allow polarized light of a direction perpendicular to the specified direction to pass through the first polarizer 121; the second polarizer 122 is configured to absorb polarized light of a specified direction, and allow polarized light of a direction perpendicular to the specified direction to pass through the second polarizer 122.

In the present embodiment, the direction of the polarized light absorbed by the first polarizer 121 and the direction of the polarized light absorbed by the second polarizer 122 can be parallel with each other or perpendicular to each other, which are not limited herein but can be configured according to actual conditions. Moreover, the first polarizer 121 and the second polarizer 122 each can be a polarizing filter or a linear polarizer.

In the present embodiment, the first ¼ wave plate 141 and the second ¼ wave plate 142 each are configured to cause a retardation of 45 degrees of the polarized light passing therethrough; that is, the two ¼ wave plates can cause a phase retardation of polarized light, and the phase retardation of the polarized light passing through a ¼ wave plate for two times is equivalent to the phase retardation of the polarized light passing through a ½ wave plate for one time.

In the present embodiment, the semi-transparent semi-reflective structure 130 is configured to transmit a part of the polarized light reaching the semi-transparent semi-reflective structure 130 and reflect another part of the polarized light reaching the semi-transparent semi-reflective structure 130.

In the present embodiment, the semi-transparent semi-retroreflective film 110 is configured to transmit a part of the polarized light reaching the semi-transparent semi-retroreflective film 110, and to reflect back another part of the polarized light along an original path in the direction of the polarized light incident on the semi-transparent semi-retroreflective film 110.

Based on the above-mentioned layer structures in the air display device 100 provided by the present embodiment, and the functions and effects of respective layer structures with respect to the light, when the first polarizer 121 is located at a light incident side of the air display device 100, the polarized light that is emitted from a light source and incident through the first polarizer 121, upon being processed by an internal optical path of the air display device 100, can exit through the second polarizer 122 to form an air image at a side of the air display device 100 away from the light source.

The air display device 100 provided by the embodiment of the present disclosure can perform air imaging of a two-dimensional picture or a three-dimensional picture. For example, the light source can be a display or a three-dimensional object. In practical applications, the air display device 100 can be placed directly in front of the light exiting side of the display or placed at one side of the three-dimensional object depending on the location of the air image. Hereinafter, the embodiments of the present disclosure will be described by taking an application scenario in which a two-dimensional picture is air imaged as an example. For example, the first polarizer 121 in the air display device 100 is placed at a position adjacent to the light exiting side of the displayer. After the displayer is turned on, the air display device 100 can perform air imaging of the plane image displayed by the displayer 200, that is, an air image containing the plane image is imaged at a side of the second polarizer 122 away from the displayer 200.

Figure 10:
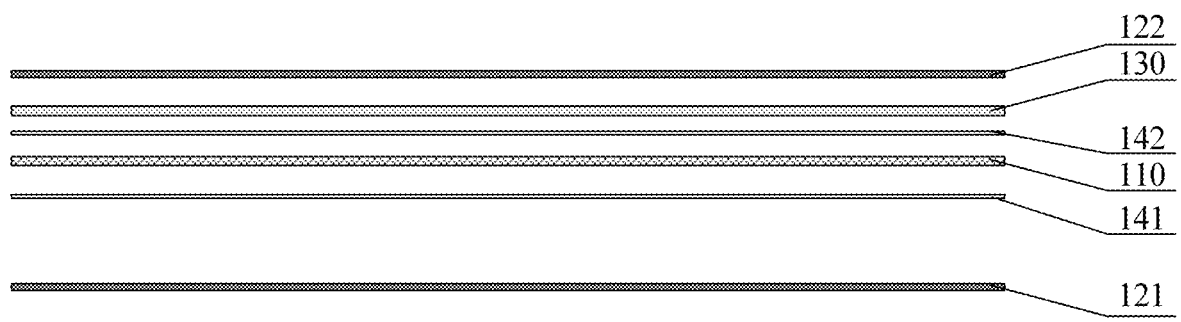
FIG. 10 is a schematic structural diagram of an air display device provided by another embodiment of the present disclosure.

It should be noted that the embodiment of the present disclosure does not specifically define the locations of the semi-transparent semi-reflective structure 130 and the semi-transparent semi-retroreflective film 110. In an implementation of the embodiment of the present disclosure, the semi-transparent semi-retroreflective film 110 is disposed adjacent to one side of the second polarizer 122, and the semi-transparent semi-reflective structure 130 is disposed adjacent to one side of the second ¼ wave plate 142, as illustrated in FIG. 9. In another implementation of the embodiment of the present disclosure, the semi-transparent semi-retroreflective film 110 is disposed adjacent to one side of the second ¼ wave plate 142, and the semi-transparent semi-reflective structure 130 is disposed adjacent to one side of the second polarizer 122, as illustrated in FIG. 10. The air display device 100 illustrated in FIG. 10 differs from the air display device 100 illustrated in FIG. 9 only in that the locations of the semi-transparent semi-reflective structure 130 and the semi-transparent semi-retroreflective film 110 are interchanged. Moreover, the air display devices 100 illustrated in FIG. 9 and FIG. 10 have a same effect on the light incident into the air display device 100.

Figure 11:
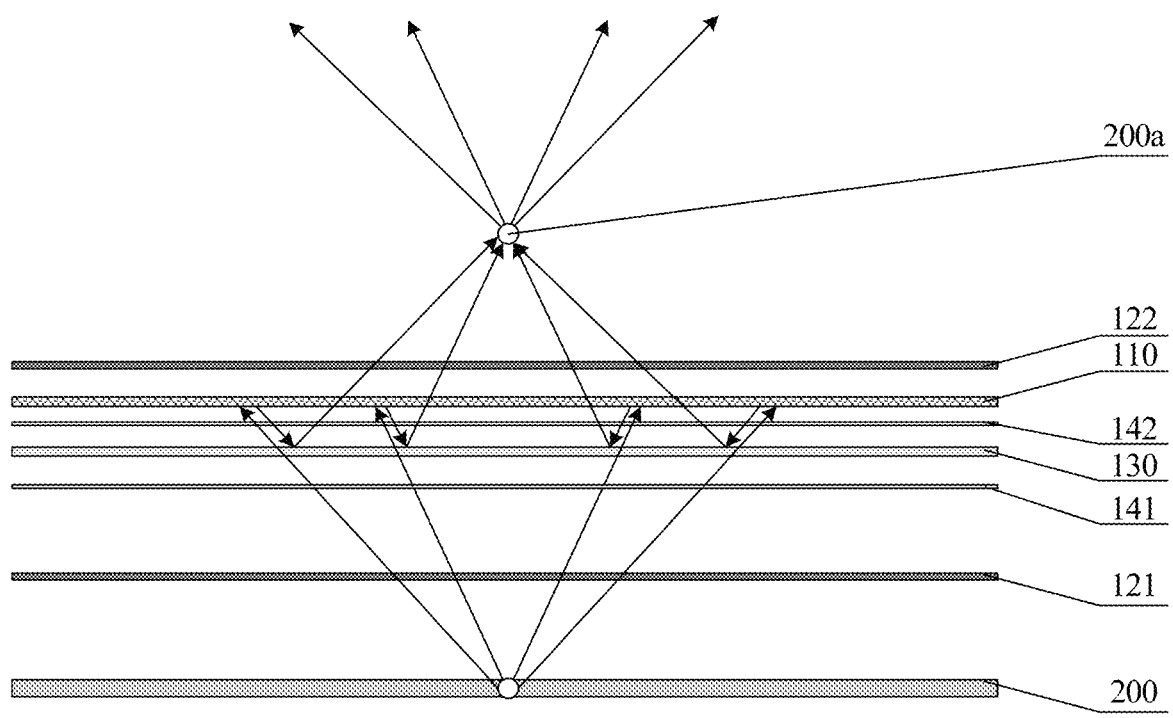
FIG. 11 is a schematic diagram of an application scenario of the air display device illustrated in FIG. 9.

A manner in which the air display device 100 provided by the embodiment of the present disclosure implements air imaging will be schematically explained below. FIG. 11 is a schematic diagram of an application scenario of the air display device illustrated in FIG. 9. The application scenario is air displaying of a two-dimensional picture. The light source is a displayer 200, the displayer 200 is disposed adjacent to one side of the first polarizer 121 of the air display device 100, and a display panel of the displayer 200 and the air display device 100 are both horizontally placed. In the present embodiment, the first polarizer 121 and the second polarizer 122 are both configured to allow polarized light of a first direction to pass therethrough and absorb polarized light of a second direction; the first direction is, for example, parallel to a lateral side of the panel of the air display device 100, which is denoted as a polarization direction ↔, and the polarized light having the polarization direction ↔ hereinafter is referred to as polarized light ↔; the second direction is a direction parallel to the panel of the air display device 100 and perpendicular to the first direction, which is denoted as a polarization direction ⊕, and the polarized light having the polarization direction ⊕ hereinafter is referred to as polarization light ⊕. In other words, the first direction and the second direction are both parallel to the panel of the aerial display device 100, and the two directions are perpendicular to each other. Hereinafter, an optical path of the light incident into the air display device 100 during the air imaging process of the air display device 100 illustrated in FIG. 9 under the application scenario illustrated in FIG. 11 is described in details.

1) The light emitted from the display 200 enters the first polarizer 121; because the first polarizer 121 allows polarized light ↔ to pass therethrough and absorbs polarized light ⊕, the light passes through the first polarizer 121 and is changed into polarized light ↔.

2) The polarized light ↔ passes through the first ¼ wave plate 141 and then reaches the semi-transparent semi-reflective structure 130.

3) A part of the polarized light ↔ reaching the semi-transparent semi-reflective structure 130 is reflected while another part thereof is transmitted; the reflected part ↔ passes through the first ¼ wave plate 141 again, and is changed into polarized light ⊕ as passing through the same ¼ wave plate twice, and is eventually absorbed by the first polarizer 121; the transmitted part ↔ passes through the second wave plate 142 and then reaches the semi-transparent semi-retroreflective film 110, and is changed into polarized light ⊕ as passing through two ¼ wave plates.

4) A part of the polarized light ⊕ reaching the semi-transparent semi-retroreflective film 110 is transmitted while another part thereof is retroreflected; the transmitted part ⊕ is absorbed by the second polarizer 122, while the retroreflected part ⊕ returns along the original optical path and passes through the second ¼ wave plate 142 and then reaches the semi-transparent semi-reflective structure 130 again.

5) A part of the polarized light ⊕ reaching the semi-transparent semi-reflective structure 130 is transmitted while another part thereof is reflected; the transmitted part ⊕ is lost in the cavity, the reflected part ⊕ passes through the second ¼ wave plate 142 again and then reaches the semi-transparent semi-retroreflective film 110 and is changed into polarized light ↔ as passing through two ¼ wave plates. It should be noted that, the transmitted part ⊕ through the semi-transparent semi-reflective structure 130 is changed into polarized light ↔ as passing through the first wave plate 141 again, and the polarized light ↔ can pass through the first polarizer 121 and be illuminated on the panel of the display 200, which would affect the image quality of air imaging. Therefore, an anti-reflection layer can be formed on the panel of the displayer 200 to reduce such influence.

6) A part of the polarized light ↔ reaching the semi-transparent semi-retroreflective film 110 again is transmitted while another part thereof is retroreflected; the transmitted part ↔ exits through the second polarizer 122, and forms an air image 200a at the light exiting side of the air display device; the retroreflected part ↔ is continuously reflected between the semi-transparent semi-reflective structure 130 and the semi-transparent semi-retroreflective film 110, and is reduced sharply in its light intensity, which makes it unable to exit. As a result, a superimposed image cannot be generated.

An air imaging process of the air display device 100 illustrated in FIG. 10 under the application scenario illustrated in FIG. 11 can be referred to the above description of the air display device 100 illustrated in FIG. 9. That is, the transmission mode of the polarized light in the semi-transparent semi-reflective structure 130 and the semi-transparent semi-retroreflective film 110, and the continuous reflection mode of the polarized light between the semi-transparent semi-reflective structure 130 and the semi-transparent semi-retroreflective film 110, are similar to the above description regarding the air display device 100 illustrated in FIG. 9, without repeating herein.

It should be noted that, in the air display device 100 provided by the embodiments illustrated in FIG. 9 and FIG. 10, the polarized light allowed to pass through the first polarizer 121 and the polarized light allowed to pass through the second polarizer 122 have a same polarization direction; that is, a through axis of the first polarizer 121 and a through axis of the second polarizer 122 are arranged parallel to each other. Moreover, the first polarizer 121 and the second polarizer 122 in the air display device 100 illustrated in FIG. 9 and FIG. 10 are configured to allow only the polarized light ↔ to pass therethrough, and absorb the polarized light ⊕, without limiting the embodiments of the present disclosure thereto. In some other embodiments, both the first polarizer 121 and the second polarizer 122 can be configured to allow the polarized light ⊕ to pass therethrough and absorb the polarized light ↔.

Figure 12:
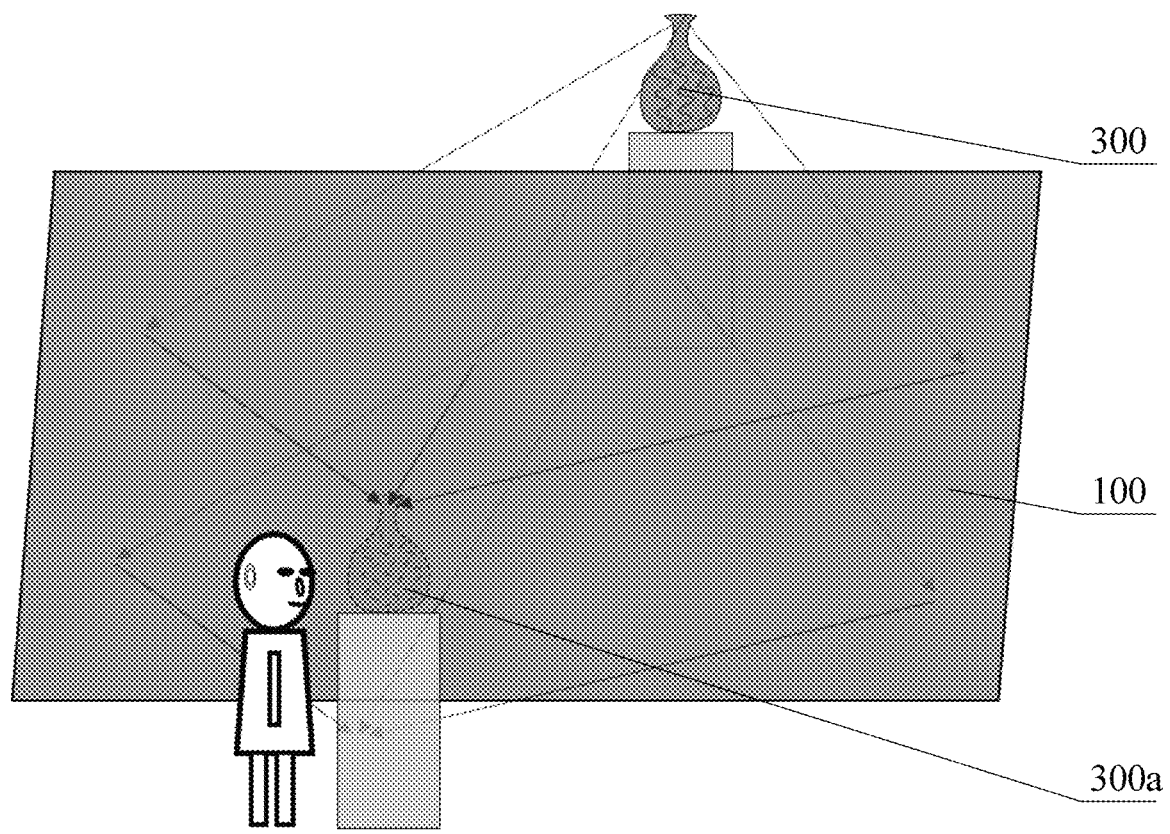
FIG. 12 is a schematic diagram of an application scenario of an air display device provided by an embodiment of the present disclosure.
Figure 13:
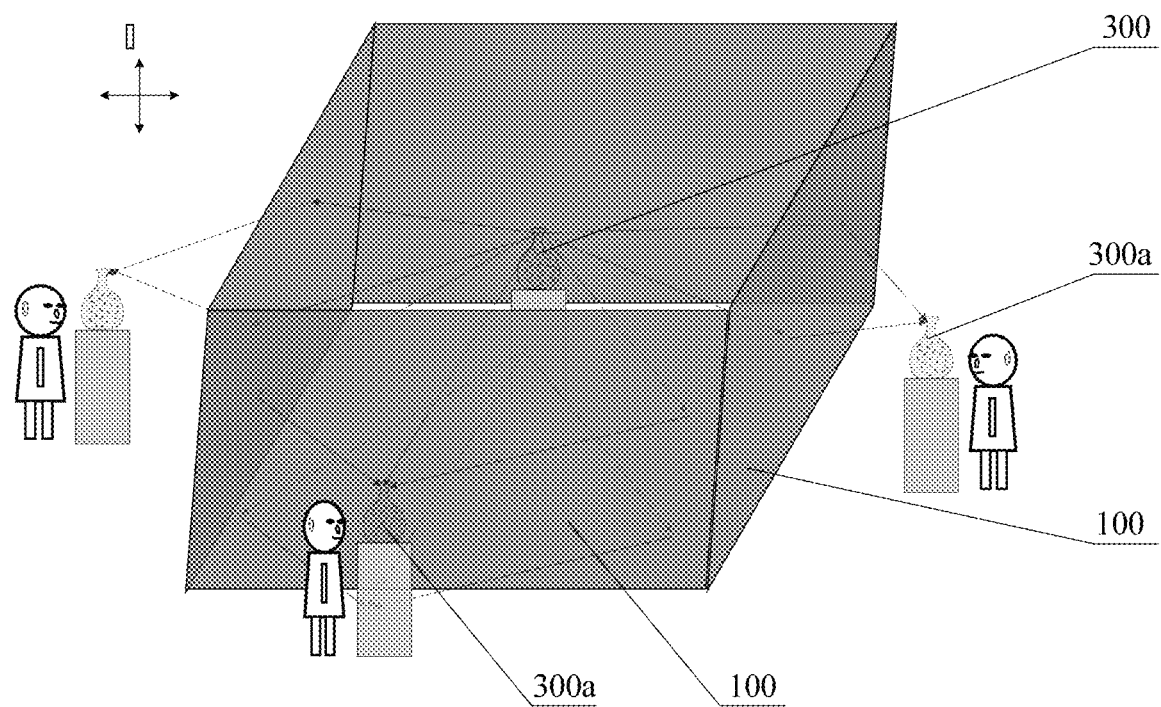
FIG. 13 is a schematic diagram of another application scenario of an air display device provided by an embodiment of the present disclosure.

FIG. 12 is a schematic diagram of an application scenario of an air display device provided by an embodiment of the present disclosure, and FIG. 13 is a schematic diagram of another application scenario of an air display device provided by an embodiment of the present disclosure. The air display device illustrated in FIG. 12 and FIG. 13 can be the air display device 100 in any one of the embodiments of the present disclosure. As illustrated in FIG. 12 and FIG. 13, the application scenario is air displaying of a three-dimensional object 300, the light source is a three-dimensional object 300, the air display device 100 is disposed at one side of the three-dimensional object 300, and the first polarizer 121 is disposed adjacent to the three-dimensional object 300. As illustrated in FIG. 12, the air display device 100 is located in a south direction of the three-dimensional object 300, and an air image 300a formed by the air display device 100 in FIG. 12 is located in the air at a side of the air display device 100 away from the three-dimensional object 300. As illustrated in FIG. 13, the air display device 100 is disposed in each of east, west, south, and north directions of the three-dimensional object 300, respectively, so that an air image 300a is formed in the air at a side of each of the four air display devices 100 away from the three-dimensional object 300 (for clarity of the drawings, the air image presented in the air by the air display device 100 disposed in the north direction is not illustrated in FIG. 13).

As can be seen from FIG. 12 and FIG. 13, the air display device 100 provided by the embodiments of the present disclosure adopts a structure of "polarizer+wave plate+semi-transparent semi-retroreflective film 110+semi-transparent semi-reflective structure 130", which realizes an imaging effect of re-aggregating the light emitted from the light source into a "virtual image" (i.e., an air image) at a side of the air display device 100 away from the light source. Therefore, a two-dimensional picture (for example, a picture displayed by a displayer) or a three-dimensional physical scene can be projected into the air, so that a person or an object can "pass through" the displayed picture or scene, similarly to a scenario in a science fiction movie, thereby realizing air display in the true sense.

It should be noted that, when the air display device 100 provided by the embodiments of the present disclosure is adopted to perform air imaging of the three-dimensional object 300, generally, the three-dimensional object 300 has to be in a very bright environment so as to achieve the purpose of air imaging by using the three-dimensional object 300 as a light source. Therefore, when performing air imaging of a three-dimensional object, the air display device 100 can be placed according to the position in the air to be imaged. When the air display device 100 provided by the embodiments of the present disclosure is used for air imaging of a three-dimensional object, a good imaging effect can be achieved; at the same time, the structure of the air display device 100 is simple and easy to be implemented, and particularly can be formed into a plane panel structure, so a volume thereof is small. Additionally, in some application scenarios such as museums and luxury exhibitions, by using the air display device 100 provided by the embodiments of the present disclosure to project a three-dimensional object into the air to form a three-dimensional virtual image, it is beneficial to protect the physical substances and has a high practical value.

As described above, the air display device provided by the embodiments of the present disclosure includes: a first polarizer and a second polarizer assembled with each other to form a cell; a semi-transparent semi-reflective structure and a semi-transparent semi-retroreflective film disposed between the first polarizer and the second polarizer; a first ¼ wave plate disposed at a side of the air display device adjacent to the first polarizer; and a second ¼ wave plate disposed between the semi-transparent semi-reflective structure and the semi-transparent semi-retroreflective film. Based on the above structure, polarized light that is emitted from the light source and passes through the first polarizer, after being processed by an internal optical path of the air display device, can pass through the second polarizer to form an air image at a side of the air display device away from the light source. The air display device provided by the embodiments of the present disclosure can effectively perform air imaging of a two-dimensional picture and a three-dimensional picture, and has a good imaging effect; at the same time, the air display device has a simple structure and is easy to be implemented, and particularly can be formed into a plane panel structure, so a volume thereof is small.

Figure 14:
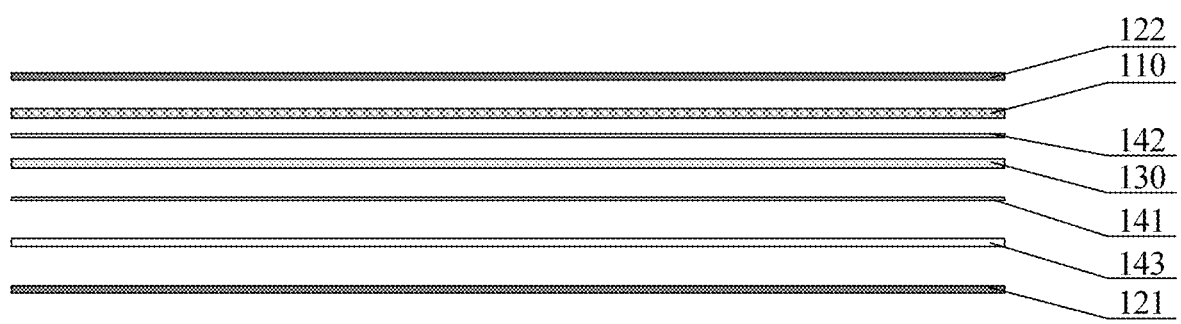
FIG. 14 is a schematic structural diagram of an air display device provided by yet another embodiment of the present disclosure.

Optionally, FIG. 14 is a schematic structural diagram of an air display device provided by yet another embodiment of the present disclosure. Based on the structure of the air display device 100 illustrated in FIG. 9, the air display device 100 provided by the present embodiment further includes: a ½ wave plate 143 disposed between the first polarizer 121 and the first ¼ wave plate 141.

Figure 15:
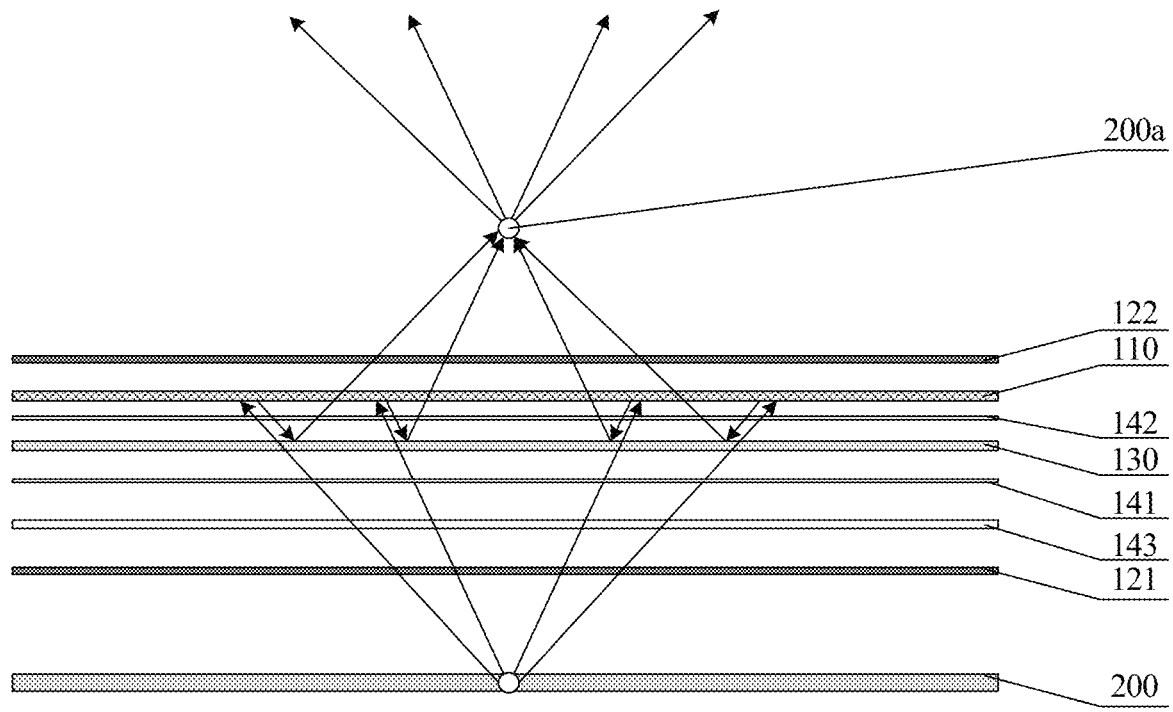
FIG. 15 is a schematic diagram of an application scenario of the air display device illustrated in FIG. 14.

FIG. 15 is a schematic diagram of an application scenario of the air display device illustrated in FIG. 14. As illustrated in FIG. 15, the application scenario is air imaging of a two-dimensional picture, the light source is a displayer 200, the displayer 200 is disposed adjacent to one side of the first polarizer of the air display device 100, and a display panel of the displayer 200 and the air display device 100 are both horizontally placed. In the present embodiment, the first polarizer 121 is configured to allow polarized light ↔ to pass therethrough and absorb polarized light ⊕, and the second polarizer 121 is configured to allow polarized light ⊕ to pass therethrough and absorb polarized light ↔. Hereinafter, an optical path of the light incident into the air display device 100 during the air imaging process of the air display device 100 illustrated in FIG. 14 under the application scenario illustrated in FIG. 15 is described in details.

1) The light emitted from the displayer 200 enters the first polarizer 121; because the first polarizer 121 allows polarized light ↔ to pass therethrough and absorbs polarized light ⊕, the light passes through the first polarizer 121 and is changed into polarized light ↔.

2) The polarized light ↔ passes through the ½ wave plate 143 and is changed into polarized light ⊕.

3) The polarized light ⊕ passes through the first ¼ wave plate 141 and then reaches the semi-transparent semi-reflective structure 130.

4) A part of the polarized light ⊕ reaching the semi-transparent semi-reflective structure 130 is reflected while another part thereof is transmitted; the reflected part ⊕ passes through the first ¼ wave plate 141 again, and is changed into polarized light ↔ as passing through the same ¼ wave plate 141 twice; then the polarized light ↔ continues to pass through the ½ wave plate 143 and is changed into polarized light, which is eventually absorbed by the first polarizer 121; the transmitted part ↔ passes through the second wave plate 142 and then reaches the semi-transparent semi-retroreflective film 110, and is changed into polarized light ↔ as passing through two ¼ wave plates.

5) A part of the polarized light ↔ reaching the semi-transparent semi-retroreflective film 110 is transmitted while another part thereof is retroreflected; the transmitted part ↔ is absorbed by the second polarizer 122, while the retroreflected part returns along the original optical path and passes through the second ¼ wave plate 142, and then reaches the semi-transparent semi-reflective structure 130 again.

6) A part of the polarized light ↔ reaching the semi-transparent semi-reflective structure 130 again is transmitted while another part thereof is reflected; the transmitted part ↔ is lost in the cavity, the reflected part H passes through the second ¼ wave plate 142 again and then reaches the semi-transparent semi-retroreflective film 110, and is changed into polarized light ⊕ as passing through two ¼ wave plates.

7) A part of the polarized light ⊕ reaching the semi-transparent semi-retroreflective film 110 is transmitted while another part thereof is retroreflected; the transmitted part ⊕ exits through the second polarizer 122, and forms an air image at the light exiting side of the air display device; the retroreflected part ⊕ is continuously reflected between the semi-transparent semi-reflective structure 130 and the semi-transparent semi-retroreflective film 110, and is decreased sharply in its light intensity, which makes it unable to exit. As a result, a superimposed image cannot be generated.

It should be noted that, in the air display device 100 illustrated in FIG. 14 and under the application scenario illustrated in FIG. 15, the polarized light allowed to pass through the first polarizer 121 and the polarized light allowed to pass through the second polarizer 122 have different polarization directions. That is, a through axis of the first polarizer 121 and a through axis of the second polarizer 122 are arranged perpendicular to each other. Moreover, in the air display device 100 illustrated in FIG. 9 and FIG. 10, the first polarizer 121 is configured to allow only the polarized light ↔ to pass therethrough and absorb the polarized light ⊕, while the second polarizer 122 is configured to allow only the polarized light ⊕ to pass therethrough and absorb the polarized light ↔, without limiting the embodiments of the present disclosure thereto. In some other embodiments, the second polarizer 122 can also be configured to allow only the polarized light ↔ to pass therethrough and absorb the polarized light ⊕, while the first polarizer 121 can also be configured to allow only the polarized light ⊕ to pass therethrough and absorb the polarized light ↔.

Optionally, referring to the embodiments illustrated in FIG. 8 and FIG. 9, in the air display device 100 illustrated in FIG. 14, the locations of the semi-transparent semi-retroreflective film 110 and the semi-transparent semi-reflective structure 130 can also be interchanged; After interchanging their locations, the transmission mode of the polarized light in the semi-transparent semi-reflective structure 130 and the semi-transparent semi-retroreflective film 110, and the continuous reflection mode of the polarized light between the semi-transparent semi-reflective structure 130 and the semi-transparent semi-retroreflective film 110, are similar to the above description regarding the air display device 100 illustrated in FIG. 14, without repeating herein.

Figure 16:
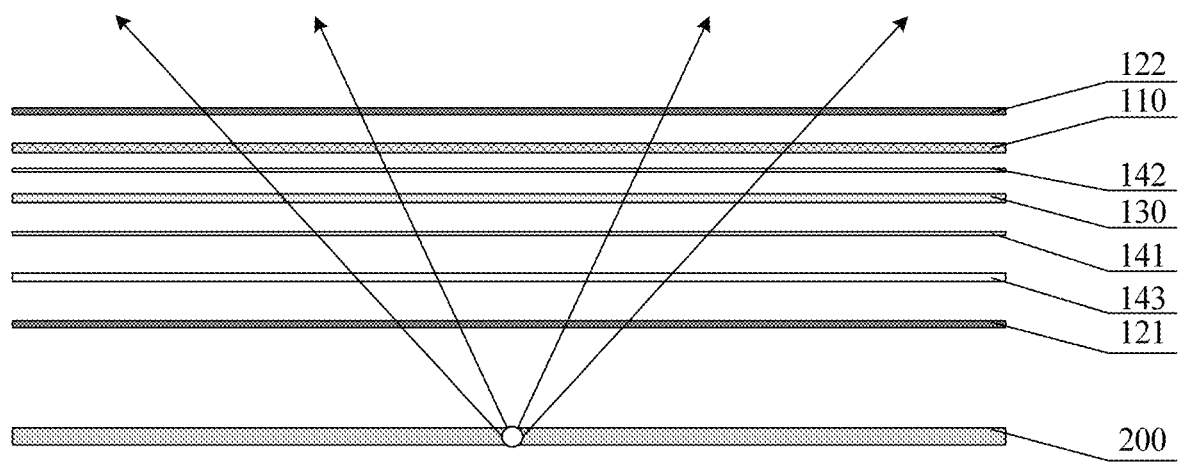
FIG. 16 is a schematic diagram of another application scenario of the air display device illustrated in FIG. 14.

Optionally, in the embodiment of the present disclosure, the ½ wave plate 143 in the air display device 100 can be provided with a switch, so that the air display device 100 can turn on or turn off the air imaging function by controlling the switch of the ½ wave plate 143. FIG. 16 is a schematic diagram of another application scenario of the air display device illustrated in FIG. 14. In the application scenario illustrated in FIG. 16, the switch of the ½ wave plate 143 of the air display device 100 is turned off.

Optionally, in the embodiment of the present disclosure, the semi-transparent semi-reflective structure 130 can include at least one of a semi-transparent semi-reflective film and a reflective polarizer. The semi-transparent semi-reflective film can transmit a part of incident light and reflect another part of the incident light. The principle and function of the reflective polarizer are described in detail below with reference to FIG. 17 and FIG. 18.

Figure 17:
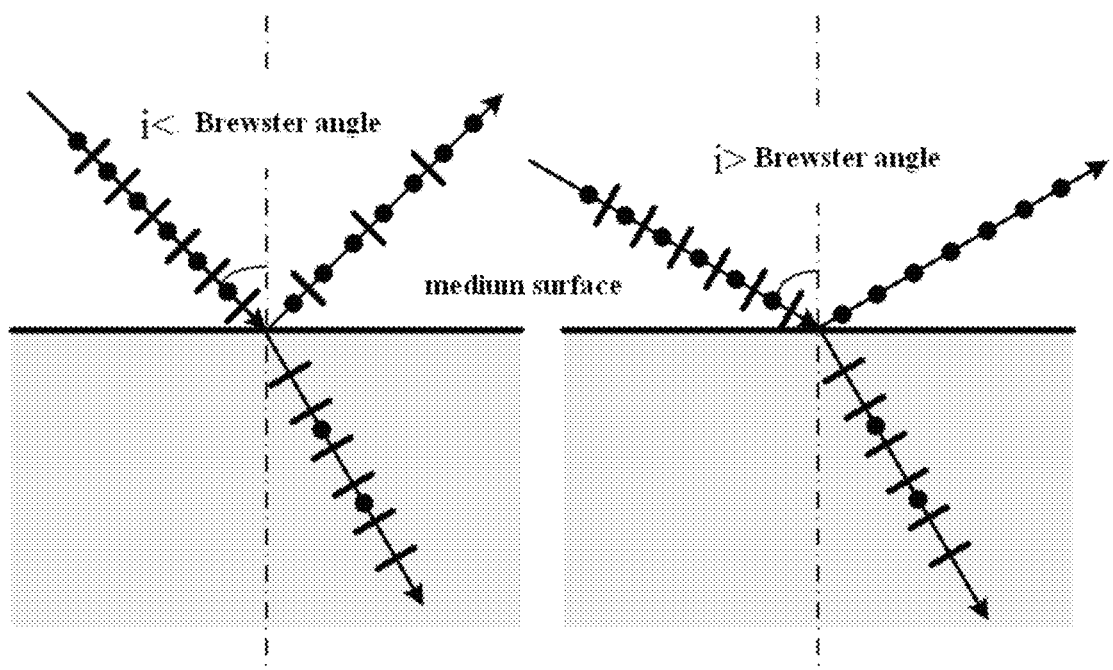
FIG. 17 is a schematic diagram of reflection effect and refraction effect of incident light on a surface of a medium.
Figure 18:
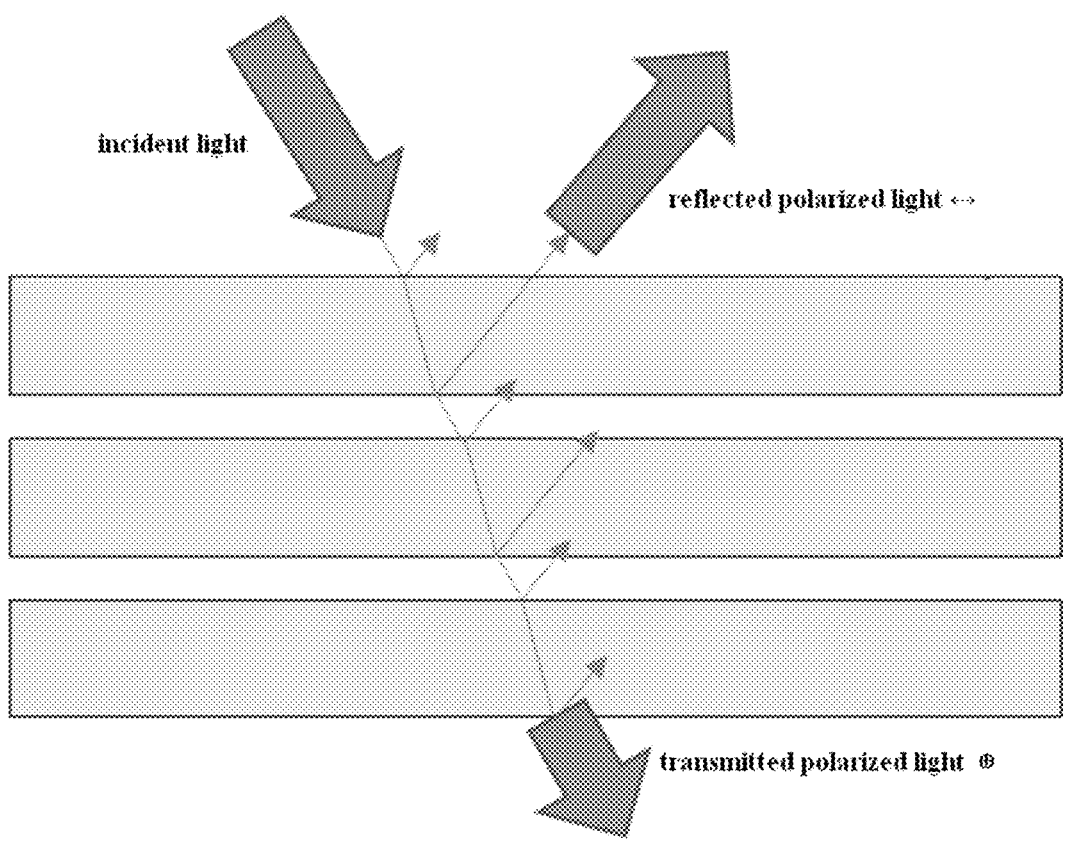
FIG. 18 is a schematic diagram illustrating a principle of a reflective polarizer in an air display device provided by an embodiment of the present disclosure.

According to Brewster's law, when a beam of light passes through an interface of a medium, a polarization direction of reflected light thereof is mostly perpendicular to the interface of the medium, a polarization direction of refracted light thereof is mostly parallel to the interface of the medium; and when an incident angle is greater than Brewster's angle, the reflected light is completely linear polarized light. FIG. 17 is a schematic diagram of reflection effect and refraction effect of incident light on an interface of a medium. FIG. 17 illustrates conditions of the reflected light and the refracted light when the incident angle (i) of the light is smaller than the Brewster's angle and when the incident angle (i) of the light is greater than Brewster's angle, a dot in the figure represents polarized light having a polarization direction perpendicular to the interface of the medium (i.e., polarized light ⊕), while a short line in the figure represents polarized light having a polarization direction parallel to the interface of the medium (i.e., polarized light ↔). Based on the above theory, a "reflective polarizer" that reflects one type of polarized light and transmits another type of polarized light can be realized by stacking layers of a plurality of refractive mediums, and a polarization direction of the reflected, polarized light is perpendicular to a polarization direction of the transmitted, polarized light. FIG. 18 is a schematic diagram illustrating a principle of a reflective polarizer in an air display device provided by an embodiment of the present disclosure. The reflective polarizer in the embodiment of the present disclosure is used to reflect polarized light ↔ and transmit polarized light ⊕. It should be noted that, by changing a microstructure of the reflective polarizer, it can be configured to reflect the polarized light ⊕ and transmit the polarized light ↔.

Based on the above principle, when the reflective polarizer is used as the semi-transparent semi-reflective structure 130 in the air display device 100 provided by the embodiments of the present disclosure, a waste of light energy can be reduced as compared with the case where a semi-transparent semi-reflective film is adopted.

Referring again to the air display device 100 under the application scenarios illustrated in FIG. 11 and FIG. 15, when the semi-transparent semi-reflective structure 130 is the reflective polarizer described above, a through axis of the reflective polarizer is as same as the through axis of the second polarizer 122. A polarization ability of the reflective polarizer (i.e., polarization degrees of transmitted light and reflected light) is inferior to that of a general polarizer. For example, a vertical absorption rate of a general linear polarizer (iodine process) can reach more than 99.9% (when the incident light is perpendicular to the through axis of the polarizer), but a vertical absorption rate of the reflective polarizer can only reach about 80%. Therefore, in the embodiment of the present disclosure, by arranging the second polarizer 122 at the light exiting side of the reflective polarizer, light (i.e., perpendicular to the through axis of the reflective polarizer) that is not reflected by the reflective polarizer can be absorbed.

Figure 19:
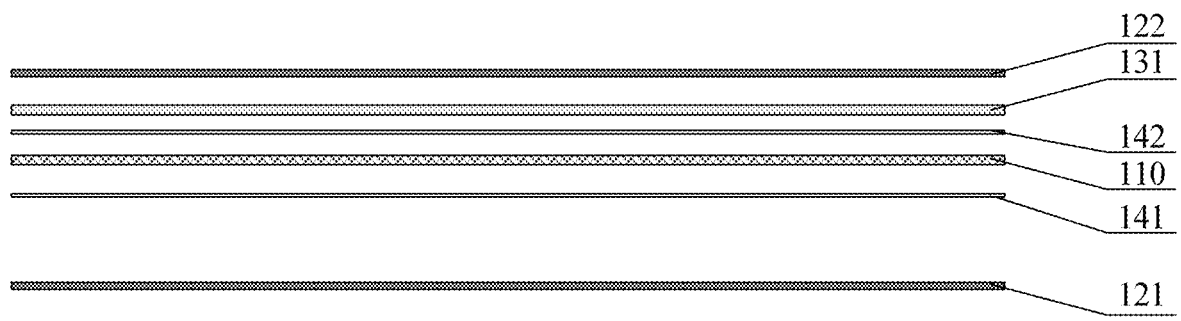
FIG. 19 is a schematic structural diagram of an air display device provided by still another embodiment of the present disclosure.

FIG. 19 is a schematic structural diagram of an air display device provided by further another embodiment of the present disclosure. As illustrated in FIG. 19, the air display device 100 provided by the present embodiment can include: a first polarizer 121 disposed adjacent to a light source and located in a light emitting direction of the light source; the semi-transparent semi-retroreflective film 110 according to any one of the above embodiments and a reflective polarizer 131 sequentially disposed at a side of the first polarizer 121 away from the light source; a first ¼ wave plate 141 disposed at a side of the air display device 100 adjacent to the first polarizer 121; and a second ¼ wave plate 142 disposed between the reflective polarizer 131 and the semi-transparent semi-retroreflective film 110.

In the present embodiment, the first polarizer 121 is configured to absorb polarized light of a specified direction and to cause polarized light of a direction perpendicular to the specified direction to pass through the first polarizer 121; the first polarizer 121 can be a polarizing filter, and can also be a linear polarizer. The reflective polarizer 131 is configured to absorb polarized light of a specified direction, and to cause polarized light of a direction perpendicular to the specified direction to pass through the reflective polarizer 131. In the present embodiment, the direction of the polarized light allowed to pass through the first polarizer 121 and the direction of the polarized light allowed to pass through the reflective polarizer 131 can be parallel or perpendicular to each other, which is not particularly limited here, but can be configured according to actual conditions. Moreover, in the present embodiment, the first ¼ wave plate 141 and the second ¼ wave plate 142 each are configured to cause a retardation of 45 degrees of the polarized light passing therethrough; that is, the two ¼ wave plates can cause a phase retardation of polarized light, and the phase retardation of the polarized light passing through these two ¼ wave plates is equivalent to the phase retardation of the polarized light passing through a ½ wave plate for one time; the semi-transparent semi-retroreflective film 110 is configured to cause a part of the polarized light reaching the semi-transparent semi-retroreflective film 110 to be transmitted through the semi-transparent semi-retroreflective film 110, and to cause another part of the polarized light to be reflected back along an original path in the direction of the polarized light incident on the semi-transparent semi-retroreflective film 110.

Based on the above-mentioned layer structures in the air display device 100 provided by the present embodiment, and the functions and effects of respective layer structures with respect to the light, the polarized light that is emitted from a light source and incident through the first polarizer 121, upon being processed by an internal optical path of the air display device 100, can exit through the reflective polarizer 131 to form an air image at a side of the air display device 100 away from the light source.

In the air display device 100 illustrated in FIG. 19, a through axis of the first polarizer 121 and a through axis of the reflective polarizer are arranged to be parallel to each other. For example, the first polarizer 121 can allow polarized light ↔ to pass therethrough and absorb polarized light ⊕, and the reflective polarizer 131 can also allow polarized light ↔ to pass therethrough and reflect polarized light ⊕. An application scenario and an optical path processing of the air display device 100 illustrated in FIG. 19 can be referred to the embodiment illustrated in FIG. 11 described above, without repeating herein.

Figure 20:
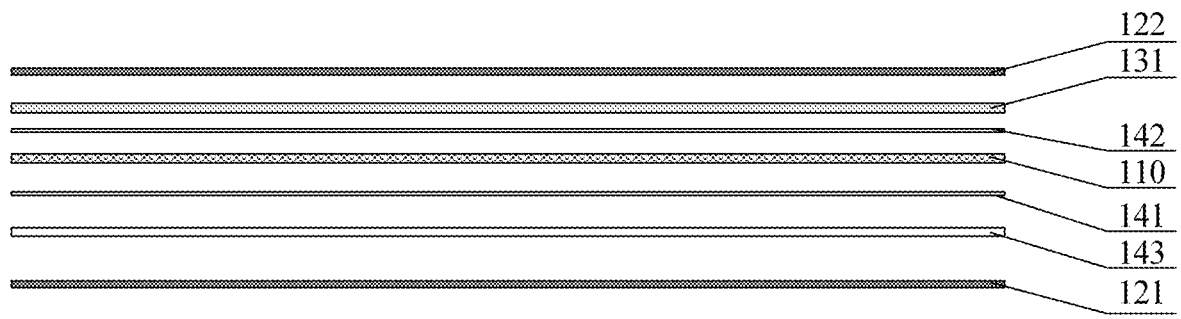
FIG. 20 is a schematic structural diagram of an air display device provided by further another embodiment of the present disclosure.

Optionally, FIG. 20 is a schematic structural diagram of an air display device provided by further another embodiment of the present disclosure. Based on the structure of the air display device 100 illustrated in FIG. 19, the air display device 100 provided by the present embodiment further includes: a ½ wave plate 143 disposed between the first polarizer 121 and the first ¼ wave plate 141.

In the air display device 100 illustrated in FIG. 20, a through axis of the first polarizer 121 and a through axis of the reflective polarizer are arranged to be parallel to each other. For example, the first polarizer 121 can allow polarized light ↔ to pass therethrough and absorb polarized light ⊕, and the reflective polarizer 131 can also allow polarized light to pass therethrough and reflect polarized light ⊕. An application scenario and an optical path processing of the air display device 100 illustrated in FIG. 20 can be referred to the embodiment illustrated in FIG. 15 described above, without repeating herein.

Optionally, in the present embodiment, the ½ wave plate 143 in the air display device 100 can be provided with a switch, so that the air display device 100 can turn on or turn off the air imaging function by controlling the switch of the ½ wave plate 143. In practical applications, when the switch of the ½ wave plate 143 is turned on, an internal optical path of polarized light emitted from the light source and passing through the first polarizer 121 in the air display device 100 is as same as that in the application scenarios of the above embodiments (referring to FIG. 15), that is, the function of the air display device 100 for air imaging is turned on; when the switch of the ½ wave plate 143 is turned off, the polarized light emitted from the light source and passing through the first polarizer 121 directly exits, and no air image is formed at a side of the air display device 100 away from the light source, that is, the function of the air display device 100 for air imaging is turned off. The application scenario and the corresponding optical path processing of the present embodiment can be referred to the above description regarding FIG. 16, without repeating herein.

Compared with the above-mentioned air display device 100 illustrated in FIG. 11 to FIG. 18, the air display device 100 provided by the embodiments illustrated in FIG. 19 and FIG. 20 is different in that, the semi-transparent semi-reflective structure 130 is replaced by the reflective polarizer 131, and the second polarizer 122 at the light exiting side is removed. Because the reflective polarizer 131 having a high vertical absorption rate (for example, greater than 99%) is employed, the second polarizer 122 at the outermost side of the air display device 100 can be removed.

It should be noted that, in each of the above embodiments of the present disclosure, a maximum refractive index axis of the first ¼ wave plate 141 and a maximum refractive index axis of the second ¼ wave plate 142, respectively, have an angle of 45 degrees with respect to a through axis of the first polarizer 121 or a through axis of the second polarizer 122; moreover, a maximum refractive index axis of the ½ wave plate 143 has an angle of 45 degrees with respect to a through axis of the first polarizer 121 or a through axis of the second polarizer 122. When the angle between the maximum refractive index axis of the various types of wave plates and the through axis of the polarizers described above is 45 degrees, it can be ensured that the polarized light passes through the wave plates effectively.

As described above, the semi-transparent semi-retroreflective film 110 provided by the embodiments of the present disclosure adopts a basic structure of "retroreflective layer 111+semi-transparent semi-reflective layer 112+planarization layer 113", which realizes a "semi-transparent, semi-retroreflective" optical effect. Moreover, the air display device 100 provided by the embodiments of the present disclosure adopts ¼ wave plates (or a combination of ¼ wave plates and a ½ wave plate), a semi-transparent semi-retroreflective film 110, a semi-transparent semi-reflective structure 130 and polarizers, to construct a plane panel structure for air imaging, which "duplicates" a two-dimensional picture or a three-dimensional physical scene to a space without media, thereby achieving "air imaging".

Although the embodiments disclosed by the present disclosure are as above, the contents described are merely the implementations adopted for the convenience of understanding the present disclosure, and are not intended to limit the present disclosure. Those skilled in the art can make any modification and change in the form and details of the implementations without departing from the spirit or scope of the disclosure, and the protection scope of the present disclosure should be based on the scope of the appended claims.

What is claimed is:

1. An air display device, comprising:
   a first polarizer and a second polarizer assembled with each other to form a cell;
   a semi-transparent semi-reflective structure and a semi-transparent semi-retroreflective film disposed between the first polarizer and the second polarizer;
   a first ¼ wave plate disposed at a side of the air display device adjacent to the first polarizer; and
   a second ¼ wave plate disposed between the semi-transparent semi-reflective structure and the semi-transparent semi-retroreflective film, wherein
   the air display device is configured such that polarized light incident from the first polarizer, upon being processed by an internal optical path of the air display device, exits from the second polarizer to form an air image at a side of the air display device away from the first polarizer, and wherein
   the semi-transparent semi-retroreflective film comprises:
   a retroreflective layer having a microstructure; and
   a semi-transparent semi-reflective layer and a planarization layer sequentially disposed at a light exiting side of the retroreflective layer, wherein
   the semi-transparent semi-retroreflective film is configured such that a part of incident light reaching a light incident side of the retroreflective layer is retroreflected in an incident direction, and another part of the incident light passing through the retroreflective layer, the semi-transparent semi-reflective layer and the planarization layer exits in the incident direction.

2. The air display device according to claim 1, further comprising a light source, wherein the first polarizer is disposed adjacent to the light source and located in a light-emitting direction of the light source.

3. The air display device according to claim 2, wherein the light source is one of a display device and a three-dimensional object.

4. The air display device according to claim 1, wherein a through axis of the first polarizer and a through axis of the second polarizer are arranged to be parallel to each other.

5. The air display device according to claim 1, further comprising:
   a ½ wave plate disposed between the first polarizer and the first ¼ wave plate, wherein a through axis of the first polarizer and a through axis of the second polarizer are arranged to be perpendicular to each other.

6. The air display device according to claim 5, wherein the ½ wave plate comprises a switch,
   the switch is configured to control the air display device to perform air imaging by controlling a turn-on or a turn-off of the ½ wave plate.

7. The air display device according to claim 5, wherein a maximum refractive index axis of the ½ wave plate has an angle of 45 degrees with respect to a through axis of the first polarizer or a through axis of the second polarizer.

8. The air display device according to claim 1, wherein the semi-transparent semi-retroreflective film is disposed at a side of the second polarizer, and the semi-transparent semi-reflective structure is disposed at a side of the second ¼ wave plate; or, the semi-transparent semi-retroreflective film is disposed at a side of the second ¼ wave plate, and the semi-transparent semi-reflective structure is disposed at a side of the second polarizer.

9. The air display device according to claim 1, wherein the semi-transparent semi-reflective structure comprises at least one of a semi-transparent semi-reflective film and a reflective polarizer.

10. The air display device according to claim 1, wherein a maximum refractive index axis of the first ¼ wave plate and a maximum refractive index axis of the second ¼ wave plate have an angle of 45 degrees with respect to a through axis of the first polarizer or a through axis of the second polarizer, respectively.

11. The air display device according to claim 1, wherein the retroreflective layer comprises a retroreflective region and a transmission region, and the semi-transparent semi-reflective layer is disposed at a side of the retroreflective region facing away from the light incident side of the retroreflective layer.

12. The air display device according to claim 1, wherein the microstructure of the retroreflective layer comprises at least one of a prism structure and a microsphere structure.

13. An air display device, comprising:
a light source;
a first polarizer, disposed adjacent to the light source and located in a light-emitting direction of the light source;
a semi-transparent semi-retroreflective film and a reflective polarizer, sequentially disposed at a side of the first polarizer away from the light source;
a first ¼ wave plate disposed at a side of the air display device adjacent to the first polarizer; and
a second ¼ wave plate disposed between the reflective polarizer and the semi-transparent semi-retroreflective film, wherein
the air display device is configured such that polarized light emitted from the light source and incident from the first polarizer, upon being processed by an internal optical path of the air display device, exits from the reflective polarizer to form an air image at a side of the air display device away from the first polarizer, and wherein the semi-transparent semi-retroreflective film comprises:
a retroreflective layer having a microstructure; and
a semi-transparent semi-reflective layer and a planarization layer sequentially disposed at a light exiting side of the retroreflective layer, wherein the semi-transparent semi-retroreflective film is configured such that a part of incident light reaching a light incident side of the retroreflective layer is retroreflected in an incident direction, and another part of the incident light passing through the retroreflective layer, the semi-transparent semi-reflective layer and the planarization layer exits in the incident direction.

14. The air display device according to claim 13, wherein the light source is one of a display device and a three-dimensional object.

15. The air display device according to claim 13, wherein a through axis of the first polarizer and a through axis of the reflective polarizer are arranged to be parallel to each other.

16. The air display device according to claim 13, further comprising:

a ½ wave plate disposed between the first polarizer and the first ¼ wave plate, wherein a maximum refractive index axis of the ½ wave plate has an angle of 45 degrees with respect to a through axis of the first polarizer.

17. The air display device according to claim 16, wherein the ½ wave plate comprises a switch, the switch is configured to control the air display device to perform air imaging by controlling a turn-on or a turn-off of the ½ wave plate.

18. The air display device according to claim 13, wherein the retroreflective layer comprises a retroreflective region and a transmission region, and the semi-transparent semi-reflective layer is disposed at a side of the retroreflective region facing away from the light incident side of the retroreflective layer.

\* \* \* \* \*

UNITED STATES PATENT AND TRADEMARK OFFICE
CERTIFICATE OF CORRECTION

PATENT NO. : 11,231,595 B2  
APPLICATION NO. : 16/442975  
DATED : January 25, 2022  
INVENTOR(S) : Xiaolong Li et al.

Page 1 of 1

It is certified that error appears in the above-identified patent and that said Letters Patent is hereby corrected as shown below:

On the Title Page

(73) Assignee should read: BOE TECHNOLOGY GROUP CO., LTD., Beijing (CN)

Signed and Sealed this  
Thirtieth Day of April, 2024

Katherine Kelly Vidal  
*Director of the United States Patent and Trademark Office*